US012416063B2

(12) United States Patent
Lincoln

(10) Patent No.: US 12,416,063 B2
(45) Date of Patent: Sep. 16, 2025

(54) LEACHING FLUID CONTROL SYSTEMS FOR MINING OPERATIONS

(71) Applicant: Southwest Irrigation LLC, Wilcox, AZ (US)

(72) Inventor: Kyle Lincoln, Wilcox, AZ (US)

(73) Assignee: Southwest Leaching Technologies, LLC, Pearce, AZ (US)

( * ) Notice: Subject to any disclaimer, the term of this patent is extended or adjusted under 35 U.S.C. 154(b) by 0 days.

(21) Appl. No.: 18/690,689

(22) PCT Filed: Sep. 8, 2022

(86) PCT No.: PCT/US2022/042965
§ 371 (c)(1),
(2) Date: Mar. 8, 2024

(87) PCT Pub. No.: WO2023/039109
PCT Pub. Date: Mar. 16, 2023

(65) Prior Publication Data
US 2024/0271246 A1 Aug. 15, 2024

Related U.S. Application Data

(60) Provisional application No. 63/241,929, filed on Sep. 8, 2021.

(51) Int. Cl.
*C22B 3/02* (2006.01)
(52) U.S. Cl.
CPC ..................... *C22B 3/02* (2013.01)

(58) Field of Classification Search
CPC .................. C22B 3/02; E21B 43/28
USPC .... 266/78, 101, 114; 75/744, 739, 711, 723, 75/741, 736, 733
See application file for complete search history.

(56) References Cited

U.S. PATENT DOCUMENTS 1,244,465 A 10/1917 Braly
1,454,864 A 5/1923 Schaake
1,671,706 A 5/1928 William
(Continued)

FOREIGN PATENT DOCUMENTS

CN 203389413 * 1/2014

OTHER PUBLICATIONS

CN203389413, mining water filtering system, Ye, Yuan-Yong (Year: 2014).*
(Continued)

*Primary Examiner* — Jessee R Roe
*Assistant Examiner* — Michael Aboagye
(74) *Attorney, Agent, or Firm* — Grossman, Tucker, Perreault & Pfleger, PLLC

(57) ABSTRACT

The present disclosure provides a leaching fluid control system for mining operations that includes controllable valve circuitry in fluid communication with a leaching fluid source, the controllable valve circuitry to provide a controlled flow rate of the leaching fluid; flow rate sensor circuitry in fluid communication with the controllable valve circuitry and with one or more leaching fluid lines to generate a flow rate signal indicative of the leaching fluid flow rate through the controllable valve circuitry; and controller circuitry to control the controllable valve circuitry to deliver a flow rate of leaching fluid based on the flow rate signal and one or more flow rate thresholds.

12 Claims, 7 Drawing Sheets

(56) References Cited

U.S. PATENT DOCUMENTS

| | | | |
|---|---|---|---|
| 1,833,704 A | 11/1931 | Bins | |
| 2,721,050 A | 10/1955 | Sams | |
| 2,804,095 A | 8/1957 | Hans | |
| 3,776,141 A | 12/1973 | Gelhard | |
| 3,993,293 A * | 11/1976 | Mukae | C22B 3/02 |
| | | | 324/438 |
| 4,017,309 A | 4/1977 | Johnson | |
| 4,069,765 A | 1/1978 | Muller | |
| 4,091,070 A * | 5/1978 | Riggs | C22B 15/0071 |
| | | | 423/41 |
| 4,248,628 A * | 2/1981 | Esna-Ashari | C22B 60/0226 |
| | | | 75/724 |
| 4,625,631 A | 12/1986 | Vera | |
| 4,753,484 A | 6/1988 | Stolarczyk et al. | |
| 5,005,606 A | 4/1991 | Carroll | |
| 5,005,806 A | 4/1991 | Krauth | |
| 5,226,456 A | 7/1993 | Semak | |
| 5,240,503 A | 8/1993 | Levy et al. | |
| 5,256,002 A | 10/1993 | Shimizu | |
| 5,655,457 A | 8/1997 | Sherman | |
| 5,901,361 A | 5/1999 | Luong | |
| 6,360,669 B1 | 3/2002 | Albrich | |
| 6,508,608 B1 | 1/2003 | Nilson et al. | |
| 6,655,641 B2 | 12/2003 | Sherman | |
| 8,202,411 B2 * | 6/2012 | Buschmann | C25C 1/22 |
| | | | 205/348 |
| 8,801,327 B2 | 8/2014 | Johnson | |
| 10,189,484 B2 | 1/2019 | Grip | |
| 10,604,163 B2 | 3/2020 | Souchal | |
| 11,639,539 B2 * | 5/2023 | Dean, Jr. | G08B 21/182 |
| | | | 75/743 |
| 11,993,826 B2 * | 5/2024 | Buffington | C22B 11/04 |
| 2002/0041840 A1 | 4/2002 | Arroyo et al. | |
| 2003/0000414 A1 | 1/2003 | Sherman | |
| 2008/0121399 A1 | 5/2008 | Zupanick | |
| 2013/0092704 A1 | 4/2013 | Tincher et al. | |
| 2013/0125709 A1 | 5/2013 | Morrow et al. | |
| 2015/0346374 A1 | 12/2015 | Campbell | |
| 2019/0041016 A1 | 2/2019 | Glennerster | |

OTHER PUBLICATIONS

International Search Report and Written Opinion from related matter PCT/US22/42965 mailed Jan. 4, 2023.

Bester et al. "Reconciliation of the mining value chain-mine to design as a critical enabler for optimal and safe extraction of the mineral reserve." Journal of the Southern African Institute of Mining and Metallurgy 116.5 (2016): 407-411. May 2016.

International Search Report and Written Opinion from related PCT PCT/US22/32368 mailed Oct. 12, 2022.

International Preliminary Report on Patentability from corresponding PCT Appln. No. PCT/US2022/032368, dated Nov. 21, 2023. 6 pages.

Notice of Allowance from related U.S. Appl. No. 18/533,539 mailed Mar. 14, 2024.

International Preliminary Report on Patentability from corresponding PCT Appln. No. PCT/US2022/042965, dated Mar. 5, 2024. 6 pages.

* cited by examiner

LEACHING FLUID CONTROL SYSTEMS FOR MINING OPERATIONS

CROSS REFERENCE TO RELATED APPLICATION

This application is a continuation of International application No. PCT/US22/42965 filed 8 Sep. 2022, which is based on and claims the benefit of U.S. Provisional Patent Application Ser. No. 63/241,929, filed 8 Sep. 2021, both of which are incorporated by reference herein in their entirety.

TECHNICAL FIELD

The present disclosure relates to leaching fluid control systems for mining operations.

BACKGROUND

Open-pit mines are in operation throughout the world to enable mining of precious and/or industrial minerals such as copper, gold, silver, platinum, etc. An open-pit mine is usually formed as earth material is removed, forming a vast hole. The removed earth is placed on a liner and levelled to form a leach pad. As additional earth material is added to the leach pad, each layer adds to the height of the leach pad, and forms a slope on the sides. The slope section generally runs from the top of the leach pad (e.g., surface level) to the bottom of the leach pad, and depending on the depth and size of the leach pad, the slope section can be several hundred feet or more in length from top to bottom. To extract minerals from the earth material on the leach pad, a leaching fluid (typically, an acidic solution) is applied to the leach pad to soak through the layers of earth, thus forming a mineral-rich slurry. The slurry may then be collected from the liner, and the dissolved minerals may be recovered from the slurry using known recovery processes.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
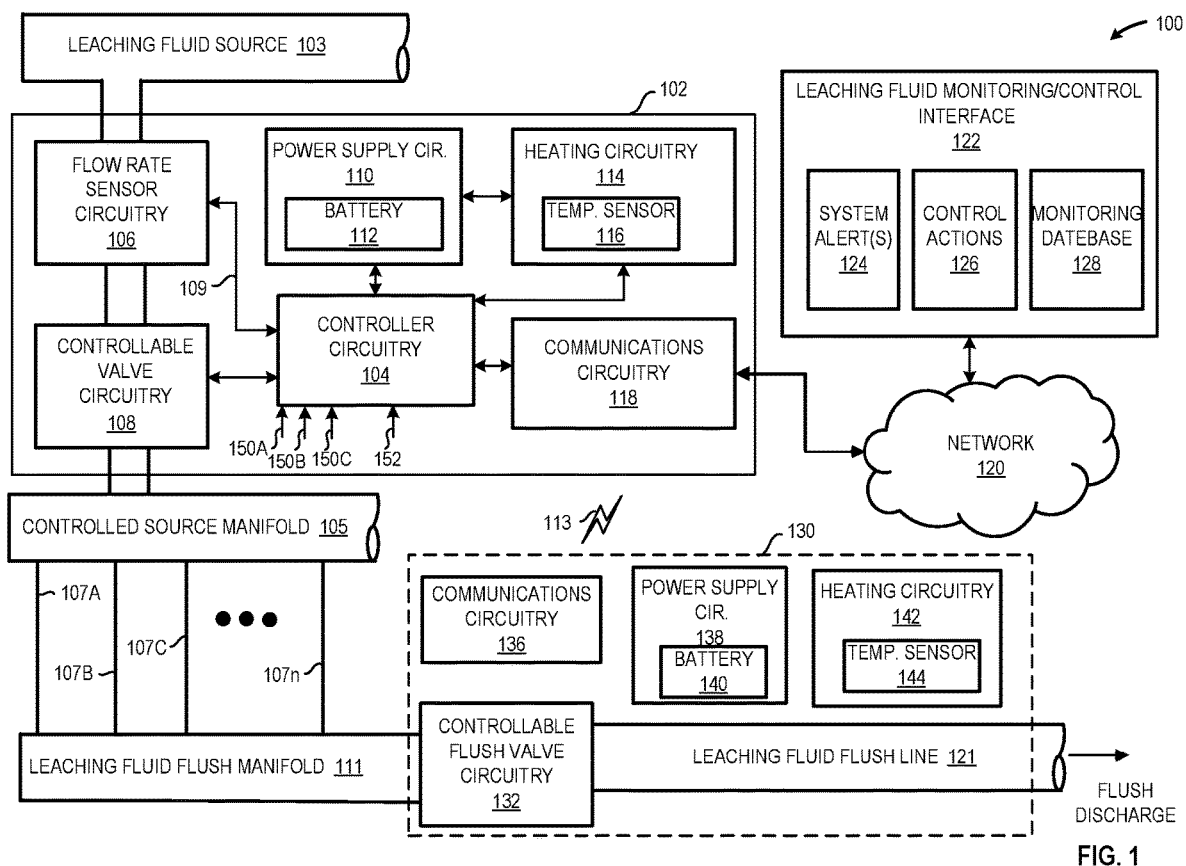
FIG. 1 illustrates a leaching fluid control system according to various embodiments of the present disclosure.

FIG. 1 illustrates a leaching fluid control system 100 according to various embodiments of the present disclosure. The system 100 includes a flow control system 102 generally configured to monitor and control leaching fluid pressure and flow rate of leaching fluid from a leaching fluid source 103 to a controlled source manifold 105 to deliver controlled leaching fluid to a plurality of leaching lines 107A, 107B, 107C, . . . , 107n. The system 100, in some embodiments, may also include a flush control system 130 generally configured to flush the plurality of leaching lines 107A, 107B, 107C, . . . , 107n, via flush manifold 111. The leaching fluid source 103 may include, for example, a pipe, tank, container, etc. that contains a leaching fluid, such as an acidic solution used to leach precious and/or industrial minerals from soil/rock. The controlled source manifold 105 and flush manifold 111 may each include a pipe, tank, container, etc. As a general matter, and depending on a particular deployment of the system 100, the leaching fluid source 103 may be dimensioned and/or capable of delivering flow rates on the order of 100 gallons/minute. Of course, this is only an example, and the system 100 of the present disclosure may be configured to deliver any desired flow rate of leaching fluid.

The flow control system 102 includes controller circuitry 104 generally configured to control the operation of various components of the flow control system 102, as is described in greater detail below. The flow control system 102 also includes flow rate sensor circuitry 106 in fluid communication with the leaching fluid source 103, generally configured to sense a flow rate of leaching fluid from the source 103 to the plurality of leaching lines 107A, 107B, 107C, . . . , 107n. In one example embodiment, the flow rate sensor circuitry 106 may include a flow rate sensor manufactured and distributed by Euromag (e.g., Euromag Magmeter, etc.).

The flow control system 102 also includes controllable valve circuitry 108 in fluid communication with the flow rate sensor circuitry 106. The controllable valve circuitry 108 is configured to provide a controlled flow rate of leaching fluid, to be delivered to the plurality of leaching lines 107A, 107B, 107C, . . . , 107n. In one example embodiment, the controllable valve circuitry 108 may include a flow control device manufactured by Euromag and distributed by Barmad Corporation. In some embodiments, the controllable valve circuitry 106 may also include pressure sensor circuitry (not shown) generally configured to determine a forward pressure from the leaching fluid source 103 and/or a back pressure from the plurality of leaching lines 107A, 107B, 107C, . . . , 107n. The flow rate sensor circuitry 106 is also in fluid communication with the controlled source manifold 105, and in fluid communication with the plurality of leaching lines 107A, 107B, 107C, . . . , 107n.

The flow control system 102 also includes power supply circuitry 110 generally configured to provide power to various components of the flow control system 102. The power supply circuitry 110 may include one or more battery systems 112. The battery systems 112 may include one or more rechargeable battery technologies, for example, nickle cadmium (NiCd), lithium ion (LiIon), etc. The power supply circuitry 110 may include commercially available and/or custom power supply circuit topologies, for example, a linear power supply, voltage/mode/current mode switching power supply, etc. In embodiments described herein, the power supply circuitry 110 may be coupled to a solar panel array (described below) to enable recharging of the battery system 112 using solar energy.

The flow control system 102 also includes heating circuitry 114 generally configured to provide heat, directly or indirectly, to one or more components of the flow control system 102. For example, the heating circuitry 114 may be configured to provide heat to leaching fluid flowing through the controllable valve circuitry 108 and/or the flow rate sensor circuitry 106 to prevent freezing of the leaching fluid. In some embodiments, the heating circuitry 114 may include temperature sensor circuitry 116 generally configured to sense temperature in the environment around the flow control system 102. The controller circuitry 104 may control the operation (on, off, setting heat temperature, etc.) based on, at least in part, the temperature sensed by the temperature sensor 116. The heating circuitry 114 may include one or more electronic heating elements (not shown) which may provide heat using power from the battery system 112. In some embodiments, the heating circuitry 114 may also include a liquid/gas fuel supply (e.g., kerosene, propane, etc.) and one or more gas-powered heating elements to provide heat.

The flow control system 102 also includes communications circuitry 118 generally configured to exchange commands and data with a remote system (described below), via network 120. The communications circuitry 118 may communicate using a known and/or after-developed communications protocols including, for example, cellular communications protocols (e.g., LTE, 3G, 4G, 5G/6G, etc.), wireless network communications protocols (e.g., IEEE 10 BASE x, WiFi, etc.). In some embodiments, for example if the system 100 is deployed in an extremely remote location outside of cellular/wifi coverage, communications circuitry 118 may be configured to communicate using satellite communications protocols, etc. The communications circuitry 118, in some embodiments, may also be configured exchange commands and data with the flush control system 130 (described below), via wireless communications channel 113. The wireless communications channel 113 may include, for example, short range wireless radio frequency communications protocols (e.g., Bluetooth, etc.), infrared and/or near infrared communications protocols, wireless network communication protocols, cellular communications protocols, etc. Communications circuitry 118 may also include antennae systems (e.g., direction and/or polar antennae arrays, etc.) and/or signal boosting circuitry (not shown) to enable greater range of communications.

The controller circuitry 104 is configured to control the controllable valve circuitry 108, based on feedback signal 109 generated by the flow rate sensor circuitry 106 and also based on one or more flow rate thresholds, e.g., 150A, 150B, 150C. The one or more flow rate thresholds 150A, 150B, 150C may include, for example, one or more user-definable and/or pre-programmed flow rate thresholds, which may include a nominal flow rate threshold, a maximum flow rate threshold and a minimum flow rate threshold. Initially, during operation, the controller circuitry 104 controls the controllable valve circuitry 108 to deliver a desired (e.g., nominal) flow rate of leaching fluid from the source 103 to the plurality of leaching lines 107A, 107B, 107C, . . . , 107n. The controller 104 may control the controllable valve circuitry 108 so that the flow rate (as measured by flow rate sensor circuitry 106) remains within the defined minimum and maximum flow rates. Thus, the controller 104 is configured to compare the feedback signal 109 to one or more flow rate thresholds 150A, 150B, 150C to determine if the flow rate is operating within a defined range. If the flow rate drops below a defined minimum flow rate, this may indicate that one or more of the leaching lines 107A, 107B, 107C, . . . , 107n may be partially or fully clogged and/or kinked at some point along the length of a leaching lines, thus restricting flow of leaching fluid. If the flow rate exceeds a defined maximum flow rate, this may indicate a leak in the systems, for example, a leak in the one or more of the leaching lines 107A, 107B, 107C, . . . , 107n. If a defined minimum and/or maximum flow rate is exceeded, the controller 104 may control the communications circuitry 118 to generate an alert message to send to the remote interface 122, via network 120.

In some embodiments, the controller circuitry 104 may also be configured to control operations of the heating circuitry 114, for example, based on available battery power, a desired temperature threshold, etc. Thus, the controller circuitry 104 may control the heating circuitry 114 to turn on if the temperature sensor 116 indicates the ambient temperature has dropped below a predefined and/or pre-programmed temperature threshold, and to turn off once the ambient temperature has exceeded the temperature threshold. The controller circuitry 110 may also be configured to control the operation of the power supply circuitry 110, for example, to supply power to various components as needed. In addition, the controller circuitry 104 may also include power management circuitry (not shown) to control the charging and discharging of the battery system 112 based on, for example, power demand, available battery power, available solar power, etc. Thus, in some embodiments, the controller circuitry 104 may cause on or more components to enter into a low power (e.g., "sleep") mode, to conserve battery power. The controller circuitry 104 may also store historical data concerning the state and status of various components (e.g., available power, temperature, flow rate alert messages, power failure alert message, heating failure alert messages, average flow rate, component status messages, time/date stamp data, etc.), which may be transmitted to the remote interface 122 on a continuous and/or periodic basis to enable remote monitoring and control of the flow control system 102.

In some deployments of the leaching fluid control system 100, it may be advantageous to enable flushing capabilities to flush the plurality of the leaching lines 107A, 107B, 107C, . . . , 107n. Accordingly, in at least one embodiment, the leaching control system 100 may also include flush control system 130 generally configured to flush the plurality of leaching lines 107A, 107B, 107C, . . . , 107n, via flush manifold 111. The flush manifold 111 may be generally coupled to the end sections of each of the plurality of leaching lines 107A, 107B, 107C, . . . , 107n and in fluid communication with the controlled source manifold 105. The flush control system 130 includes controllable flush valve circuitry 132 arranged in-line with respect to the flush manifold 111 and generally configured to control a flow of leaching fluid through the flush manifold 111. The flush control system 130 may also include power supply circuitry 138 and battery circuitry 140, similar to power supply 110/battery 112, described above. The flush control system 130 may also include heating circuitry 142 and temperature sensor 144, similar to heater 114 and temperature sensor 116, described above. To enable communication with the flow control system 102, the flush control system 130 may also include communications circuitry 136 to exchange commands and data with the flow control system 102, via wireless communications channel 113. Communications circuitry 136 may also include antennae systems (e.g., direction and/or polar antennae arrays, etc.) and/or signal boosting circuitry (not shown) to enable greater range of communications.

Controller circuitry 104 may control a flushing operation by controller the flush system 130 to flush the leaching lines 107A, 107B, 107C, . . . , 107n by "opening" the leaching fluid manifold flush 111 to discharge leaching fluid. In some embodiments, flush operations may be performed at user-definable and/or programmable intervals. Thus, controller circuitry 104 may also include timer circuitry (not shown) to enable timing of flush operations. The timing circuitry may utilize a programmable timing input 152 to perform flush operations at timing intervals defined by the input 152 (for example, flush the leaching lines 107A, 107B, 107C, . . . , 107n every hour, etc.). In some embodiments, controller circuitry 104 may initiate a flush operation based on flow/pressure conditions detected in the leaching 107A, 107B, 107C, . . . , 107n. For example, a clog in one or more of the leaching lines 107A, 107B, 107C, . . . , 107n may be evident when controller circuitry 104 detects a drop in flow rate (as indicated by the flow rate sensor 106). The controller 104 may attempt to correct the drop in pressure by opening the controllable valve 108 further to compensate for the drop in flow rate. If the flow rate remains reduced, controller 104 may initiate a flush operations by controlling the controllable flush valve circuitry 132 to flush the leaching lines 107A, 107B, 107C, . . . , 107n.

After a defined time period of a flush operation (for example, 5 minutes, etc.) The system 100 may also include a remote leaching fluid monitoring/control interface 122 generally configured to exchange commands and data with the flow control system 102, receive messages and alerts from the flow control system 102, and to control various operational aspects of the flow control system 102. In some embodiments, the interface 122 may be embodied as a smart phone device (e.g., iPhone, Galaxy, etc.) and/or smart tablet device (e.g., iPad, laptop computer, etc.), etc., that includes a display, communications circuitry, input circuitry (e.g., touch screen, keyboard, etc.). The interface 122 may include executable instructions and/or instruction sets, for example, in the form of an "app" or application, to perform the various task described herein. The interface 122 may include system alert(s) code 124 generally configured to trigger an alert upon receipt of an alert message from the flow control system 102. Examples of alert messages include available power, low battery state, temperature data, flow rate alert messages, power failure alert message, heating failure alert messages, average flow rate, component status messages, time/date stamp data, etc. The alert may include, for example, flashing lights, defined sound, vibration, generation of a text and/or email message, etc., so that a user is notified of the alert message. The interface 122 may also include control actions code 126 to generate one or more control commands to control various components of the flow control system 102. Control commands may include, for example, setting the nominal, minimum and/or maximum follow rate, initiating a flush operation, power management commands, heating commands, etc. The interface 122 may also include a monitoring database 128 to store historical data concerning the flow control system 102.

Figure 2A:
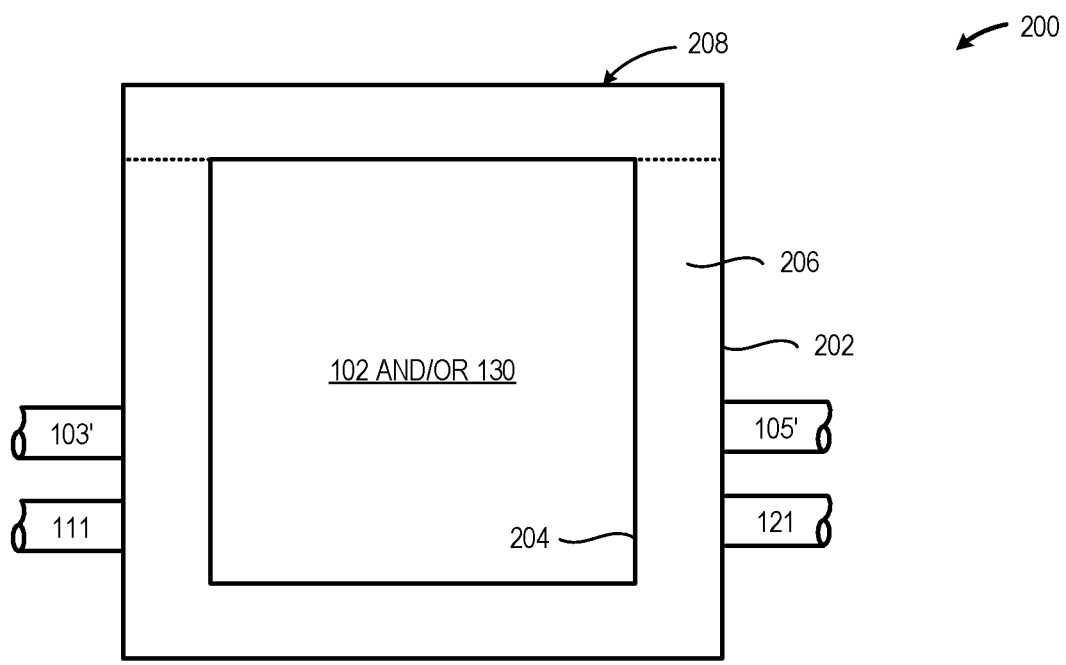
FIGS. 2A and 2B illustrate views of a housing structure to contain the flow control system and/or flush control system according to one embodiment of the present disclosure.
Figure 2B:
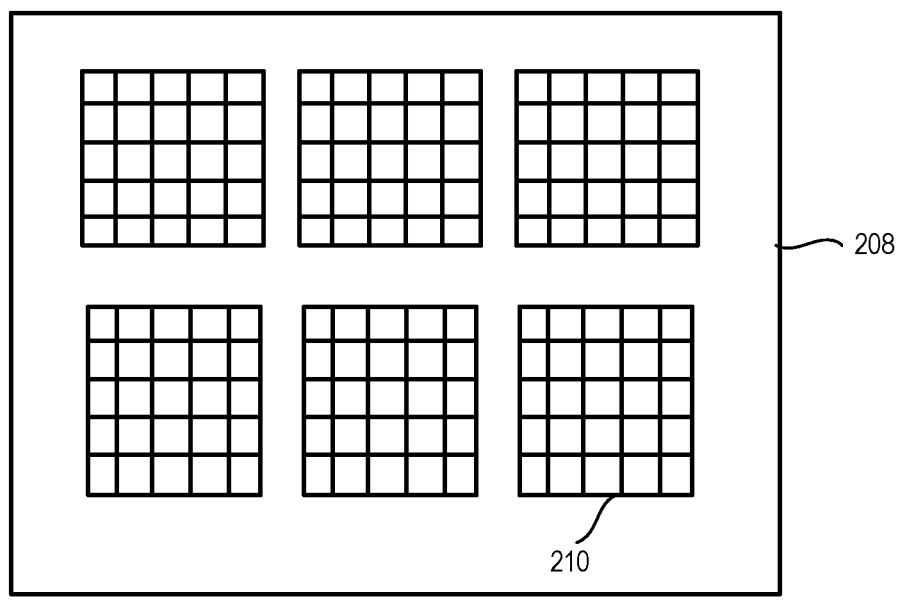

FIGS. 2A and 2B illustrate views of a housing structure 200 to contain the flow control system 102 and/or flush control system 130 according to one embodiment of the present disclosure. As illustrated in FIG. 2A, the housing 200 generally includes an outer member 202 and an inner member 204. The inner member 204 defines a chamber to contain the flow control system 102 and/or flush control system 130. The inner and outer members 202, 204 may be formed of, for example, steal, plastic, etc. Insulation material 206 may be inserted between the inner member 204 and outer member 206 to reduce temperature fluctuations within the chamber. The insulation material 206 may include, for example, fiberglass insulation, filament insulation, fabric, Styrofoam, etc. A top section 208 may be separable to provide access to the chamber. As illustrated in FIG. 2B, the top section 208 may include a plurality of solar panel arrays (210) to provide solar electricity for the flow control system 102 and/or flush control system 130. In some embodiments, the top section 208 may include internal channels or conduits to enable heat to reach to the solar panel arrays (210) to prevent ice/snow build up on the arrays. While FIGS. 2A and 2B illustrate a housing structure 200 having a generally rectangular shape, it will be appreciated that the housing structure 200 may have any shape/dimensions sufficient to contain the flow control system 102 and/or flush control system 130.

Figure 3A:
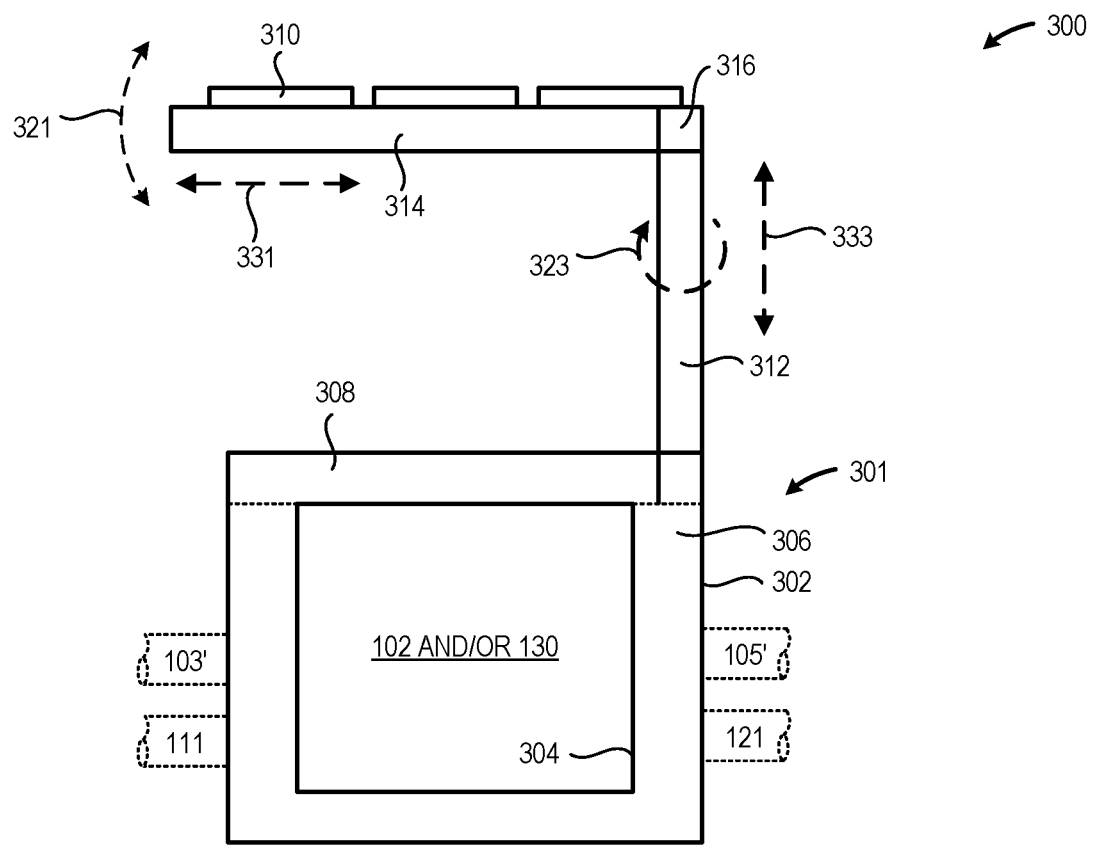
FIGS. 3A and 3B illustrate views of a housing structure to contain the flow control system and/or flush control system according to another embodiment of the present disclosure.
Figure 3B:
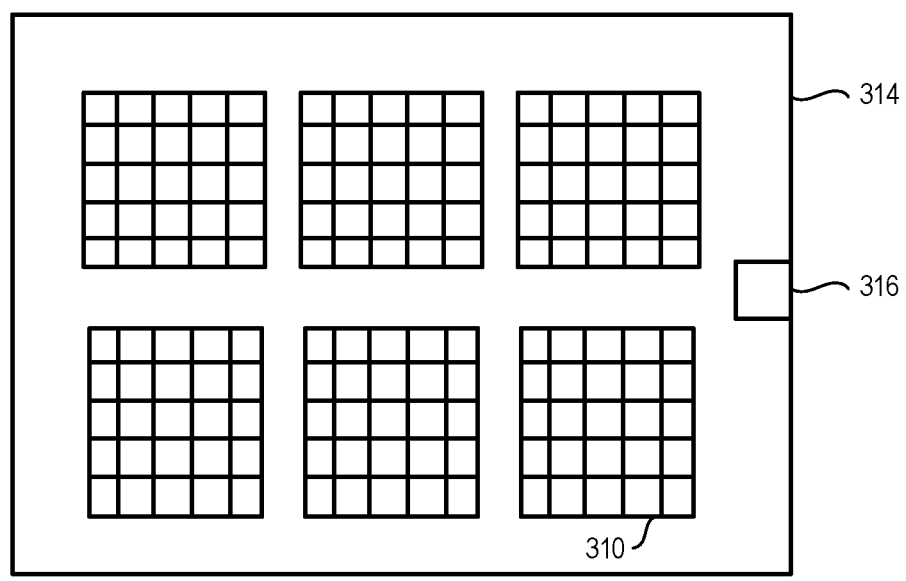

FIGS. 3A and 3B illustrate views of a housing structure 300 to contain the flow control system 102 and/or flush control system 130 according to another embodiment of the present disclosure. As illustrated in FIG. 3A, the housing structure 300 generally includes a container 301 defined by an outer member 302 and an inner member 304. The inner member 304 defines a chamber to contain the flow control system 102 and/or flush control system 130. The inner and outer members 302, 304 may be formed of, for example, steal, plastic, etc. Insulation material 306 may be inserted between the inner member 304 and outer member 306 to reduce temperature fluctuations within the chamber. The insulation material 306 may include, for example, fiberglass insulation, filament insulation, fabric, Styrofoam, etc. A top section 308 may be separable to provide access to the chamber. While FIG. 3A illustrate a container 301 having a generally rectangular shape, it will be appreciated that the container 301 may have any shape/dimensions sufficient to contain the flow control system 102 and/or flush control system 130. In this embodiment, the housing structure 300 includes a boom arm 312 affixed to the container 301. A tray member 314 is affixed to the boom arm 312 at pivot joint 316. The tray member 314 includes a plurality of solar panel arrays 310. The pivot joint 316 enables the tray member 314 to pivot with respect to the container 301, as illustrated by dashed arrow 321. The pivot joint 316 may also enable the tray member 314 to rotate with respect to the container 301, as illustrated by dashed arrow 323. In some embodiments, the tray member 314 may also be configured to move laterally with respect to the container, as illustrated by dashed arrow 331 (using, for example, rail sections (not shown) and/or additional boom structures, etc.). In some embodiments, the boom arm 312 may be extendable/and/or retractable to enable raising or lowering of the tray member 312 with respect to the container 301, as illustrated by dashed arrow 333. Enabling movement of the tray member 314 may provide for optimal positioning of the solar panels 310 to provide maximal sun exposure in a given operational environment. In some embodiments, the boom arm 312 may contain antennae structures (not shown) to enhance communication. As illustrated in FIG. 3B, the tray member 314 may include a plurality of solar panel arrays (310) to provide solar electricity for the flow control system 102 and/or flush control system 130.

Figure 4A:
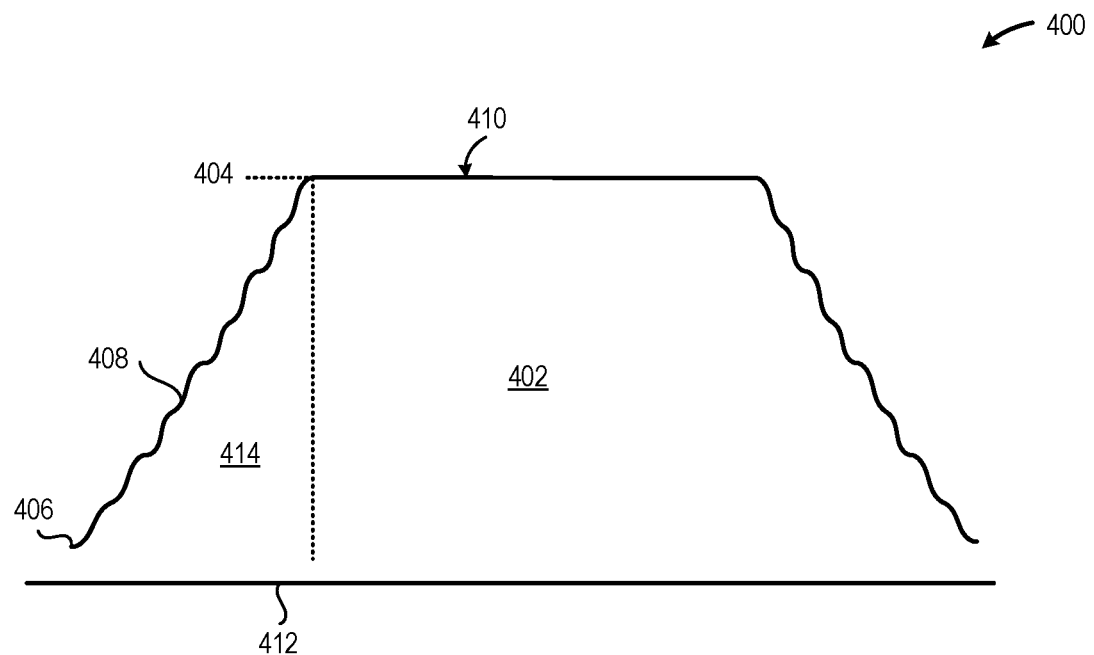
FIGS. 4A and 4B illustrate views of a leaching pad according to various embodiments of the present disclosure.
Figure 4B:
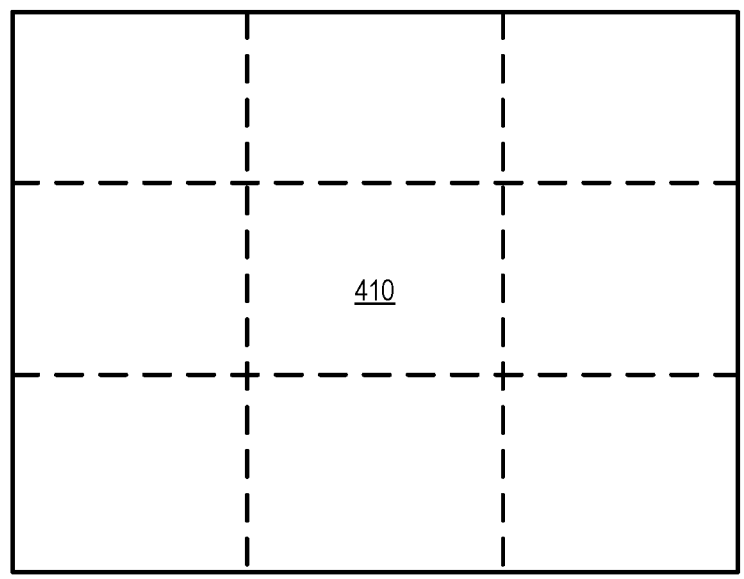

FIGS. 4A and 4B illustrate views of a leaching pad 400 according to various embodiments of the present disclosure. As is known, a leaching pad 400 is formed as earth/rock material is removed from a mine. The leaching pad 400 includes successive built up layers 402, where the top layer 410 is generally horizontal and is leached for minerals. As layers are built-up, a slope section 414 forms having a sloped surface 408, with an angle defined by a top point 404 and a bottom point 406. A liner 412 is initially disposed under the leaching pad 400 to collect the slurry formed by leaching fluid percolating through the pad 410 and various layers 402. FIG. 4B illustrates the generally horizontal pad 410, which may include a plurality of sections (depending on the size of the pad 410).

Figure 5A:
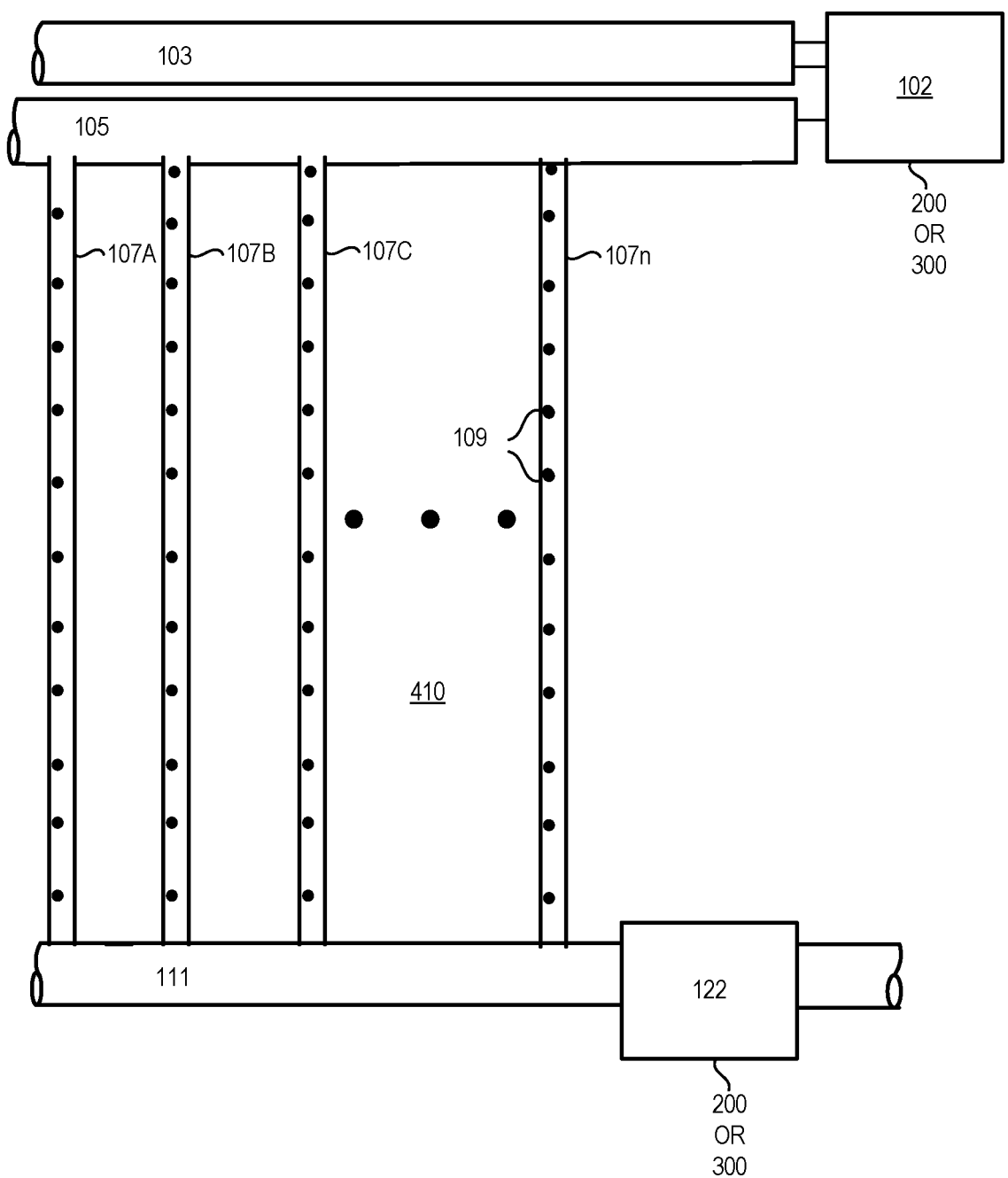
FIG. 5A illustrates the fluid control system deployed on a generally horizontal section of a leaching pad according to one embodiment of the present disclosure.

FIG. 5A illustrates a deployed leaching fluid control system 500 according to one embodiment of the present disclosure. In this embodiment, the leaching lines 107A, 107B, 107C, . . . , 107n are deployed on the horizontal section of a leaching pad 410. In this embodiment, the flow control system 102 is plumbed to minimize a distance between the leaching fluid source 103 and the controlled source manifold 105, to maximize an area that is leached by the leaching fluid lines 107A, 107B, 107C, . . . , 107n. Each leaching line 107A, 107B, 107C, . . . , 107n includes a plurality of emitter holes/slots 109 to enable the leaching fluid to exit the leaching lines onto the soil of the leach pad 410. The size of the holes/slots 109 and/or the number and spacing of the holes/slots 109 may be selected to deliver a desired flow rate per area onto the leach pad 410. For example, the size and spacing of the holes/slots 109 may be selected to deliver 0.002 gal/min/ft2 of leaching fluid. Of course, this is only an example, and size and/or spacing of the holes/slots 109 may be selected to deliver any desired flow rate per area.

Figure 5B:
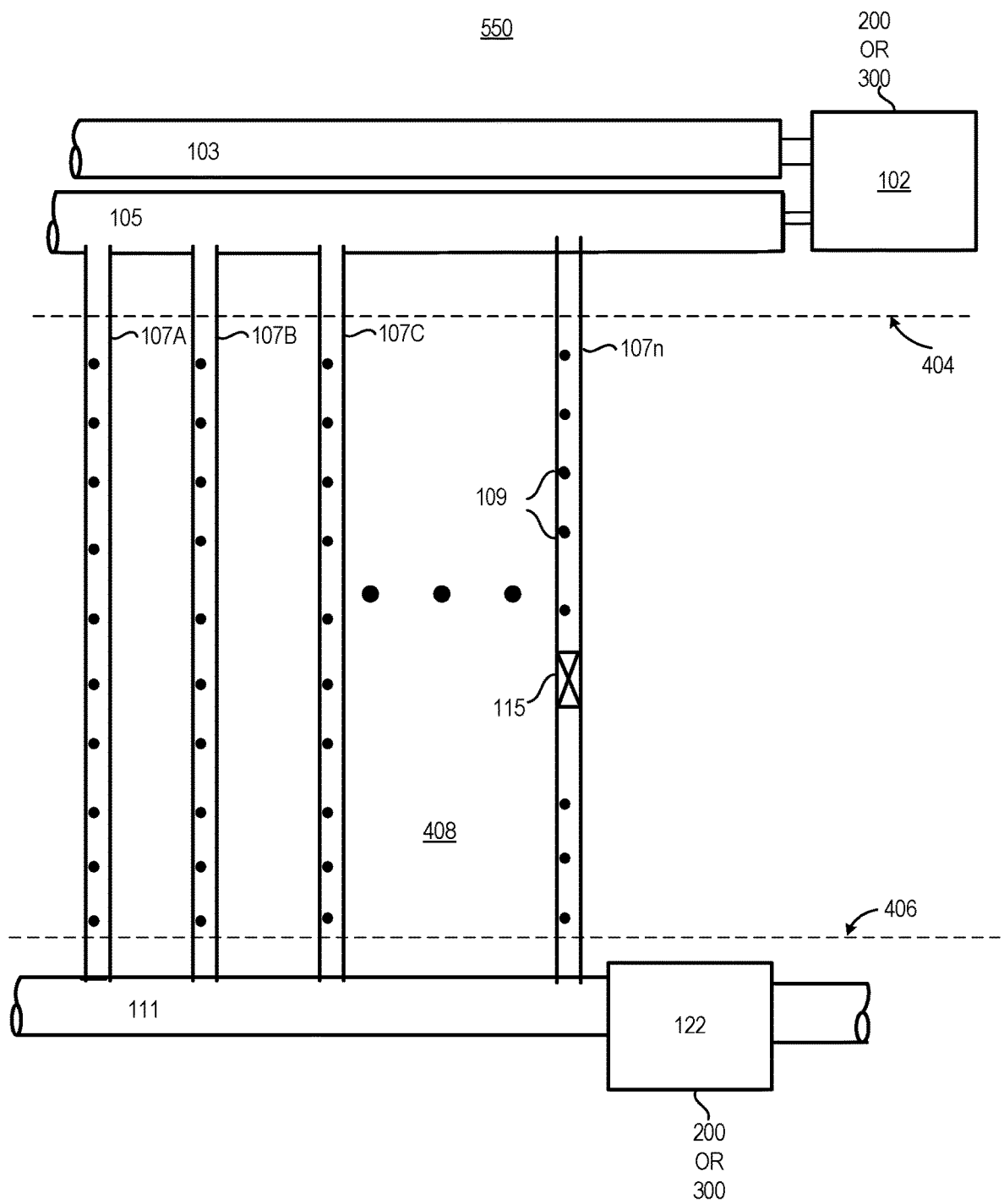
FIG. 5B illustrates the fluid control system deployed on the slope section of a leaching pad according to one embodiment of the present disclosure.

FIG. 5B illustrates a deployed leaching fluid control system 550 according to another embodiment of the present disclosure. In this embodiment, the leaching lines 107A, 107B, 107C, . . . , 107n are deployed on the slope 408 of a leach pad 400. Referring again to FIG. 4A, the top (rim) of the slope 408 is illustrated at 404, and the bottom of the slope 408 is illustrated at 406. In this embodiment, the flow control system 102 is plumbed to minimize a distance between the leaching fluid source 103 and the controlled source manifold 105, to maximize an area that is leached by the leaching fluid lines 107A, 107B, 107C, . . . , 107n. Each leaching line 107A, 107B, 107C, . . . , 107n includes a plurality of emitter holes/slots 109 to enable the leaching fluid to exit the leaching lines onto the soil of the leach pad 410. The size of the holes/slots 109 and/or the number and spacing of the holes/slots 109 may be selected to deliver a desired flow rate per area onto the leach pad 410. For example, the size and spacing of the holes/slots 109 may be selected to deliver 0.002 gal/min/ft2 of leaching fluid. Of course, this is only an example, and size and/or spacing of the holes/slots 109 may be selected to deliver any desired flow rate per area. As can be appreciated, placement of the leaching fluid lines 107A, 107B, 107C, . . . , 107n along the slope 408 may cause excessive pressure within the lines due to gravity. Accordingly, the leaching fluid lines 107A, 107B, 107C, . . . , 107n may each include one or more pressure regulators 115 to control pressure distribution along the length of the leaching fluid lines 107A, 107B, 107C, . . . , 107n.

Figure 6:
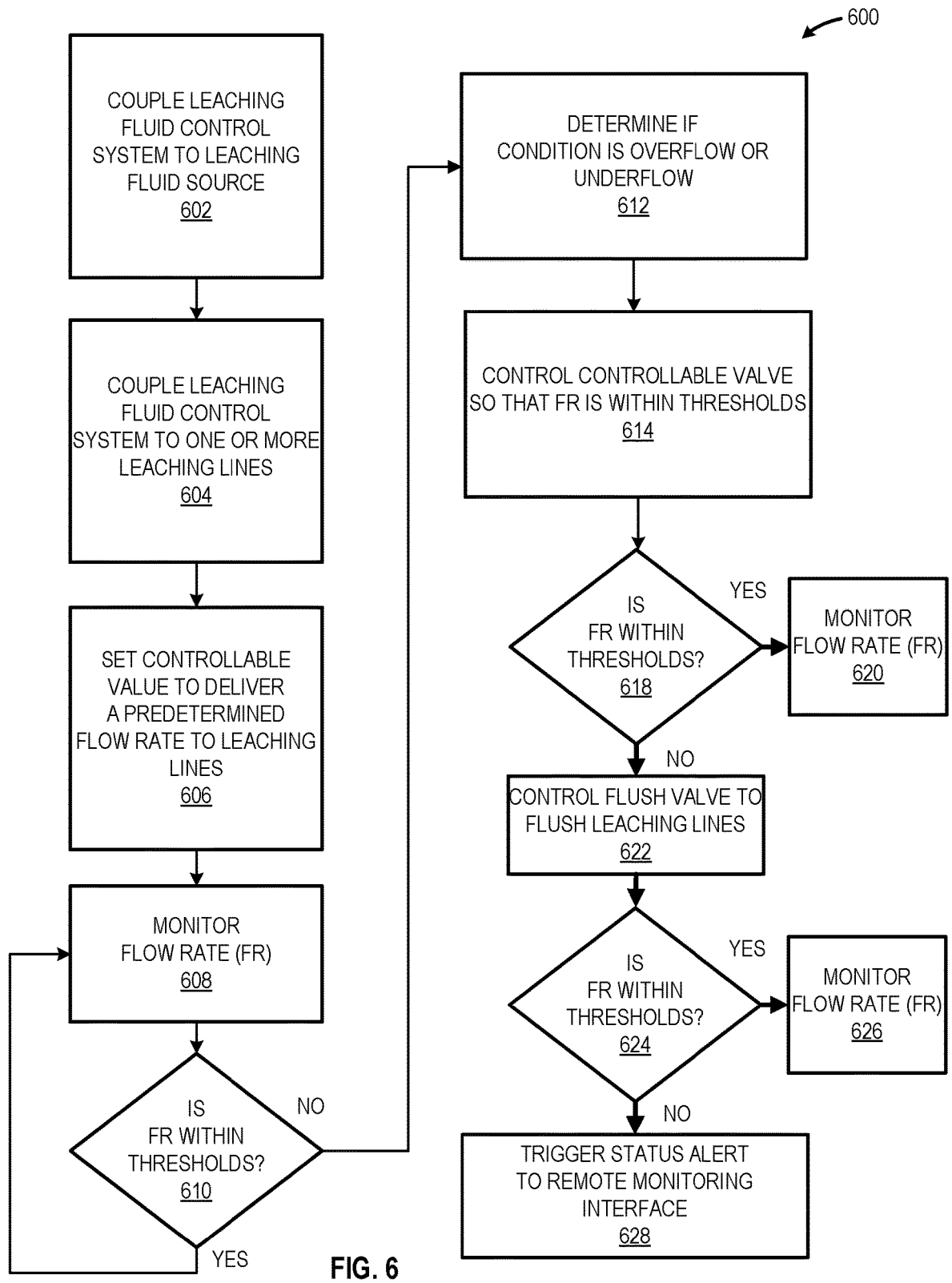
FIG. 6 illustrates a flowchart of leaching fluid monitoring and control operations according to one embodiment of the present disclosure.

FIG. 6 illustrates a flowchart 600 of leaching fluid monitoring and control operations according to one embodiment of the present disclosure. Operations of this embodiment include coupling a leaching fluid control system to a leaching fluid source 602. Operations also include coupling the leaching fluid control system to one or more leaching lines 604. Operations also include setting a controllable valve to deliver a predetermined flow rate of leaching fluid to the leaching lines 606. Operations also include monitoring the flow rate of the leaching fluid 608, and determining if the flow rate is within one or more predetermined flow rate thresholds 610. If the flow rate is within the thresholds, operations include continuing to monitor the flow rate. If the flow rate exceeds one or more flow rate thresholds, operations of this embodiment include determining if the condition is an under flow or an over flow condition 612. Operations also include controlling the controllable valve so that the flow rate is within the flow rate thresholds 614. Operations also include monitoring the flow rate of the leaching fluid and determining if the flow rate is within one or more predetermined flow rate thresholds 618. If the flow rate is within the thresholds, operations include continuing to monitor the flow rate 620. If the flow rate exceeds one or more flow rate thresholds, operations of this embodiment include controlling a flush valve to flush the leaching lines 622. Operations also include monitoring the flow rate of the leaching fluid and determining if the flow rate is within one or more predetermined flow rate thresholds 624. If the flow rate is within the thresholds, operations include continuing to monitor the flow rate 626. If the flow rate exceeds one or more flow rate thresholds, operations of this embodiment include triggering a status alert message to a remote monitoring interface 628.

While FIG. 6 illustrate various operations according to one or more embodiments, it is to be understood that not all of the operations depicted in FIG. 6 are necessary for other embodiments. Indeed, it is fully contemplated herein that in other embodiments of the present disclosure, the operations depicted in FIG. 6, and/or other flowcharts and/or operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), application-specific integrated circuit (ASIC), programmable logic devices (ILD), digital signal processors (DSP), field programmable gate array (FPGA), logic gates, registers, semiconductor device, chips, microchips, chip sets, etc. The circuitry described herein may be formed of electrical and mechanical components to operate in a manner herein described, as would be understood by one skilled in the art using conventional and/or custom components. For example, in the case of controllable valve circuitry 108 and/or 132, fluid valve components may be formed of mechanical structures (e.g., dampers, baffles, screw valve opening/closing mechanisms, and/or other known types of mechanical valve structures, etc.) and such mechanical structures may be controlled (e.g., moved, urged, rotated, etc.) using controllable electrical components such as valve actuators and the like.

Any of the operations described herein may be implemented in a system that includes one or more non-transitory storage devices having stored therein, individually or in combination, instructions that when executed by circuitry perform the operations. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A leaching fluid control system for mining operations, comprising:
   controllable valve circuitry in fluid communication with a leaching fluid source, the controllable valve circuitry to provide a controlled flow rate of the leaching fluid;
   flow rate sensor circuitry in fluid communication with the controllable valve circuitry and with one or more leaching fluid lines to generate a flow rate signal indicative of the leaching fluid flow rate through the controllable valve circuitry;
   controller circuitry to control the controllable valve circuitry to deliver a flow rate of leaching fluid based on the flow rate signal and one or more flow rate thresholds; the controller circuitry also to determine, based on the flow rate signal, if the flow rate drops below a minimum flow rate threshold indicative of a clogged and/or kinked condition of the one or more leaching fluid lines; and to determine, based on the flow rate signal, if the fluid flow rate exceeds a maximum flow rate threshold indicative of a leak associated with one or more of the leaching fluid lines; wherein the leaching fluid lines are disposed vertically on a slope section of a leach pad; and
   a flush manifold coupled to the leaching fluid lines and a controllable flush valve to flush the leaching lines; wherein the controller circuitry is configured to control the controllable flush valve to begin a flush operation if the flow rate drops below the minimum flow rate threshold; and wherein the controller circuitry further to trigger a status alert message to a remote monitoring interface if the fluid flow rate exceeds the maximum flow rate threshold.

2. The system of claim 1, further comprising power supply circuitry and a rechargeable battery system to provide power to at least the controller circuitry and the controllable valve circuitry.

3. The system of claim 2, further comprising a solar panel array to provide solar electricity to the power supply circuitry to recharge the rechargeable battery system.

4. The system of claim 1, further comprising heating circuitry to provide a heating source to at least the controllable valve circuitry.

5. The system of claim 1, further comprising communications circuitry to exchange commands and data with a remote interface.

6. A leaching fluid control system for mining operations, comprising:
   controllable valve circuitry in fluid communication with a leaching fluid source, the controllable valve circuitry to provide a controlled flow rate of the leaching fluid;
   flow rate sensor circuitry in fluid communication with the controllable valve circuitry and with one or more leaching fluid lines to generate a flow rate signal indicative of the leaching fluid flow rate through the controllable valve circuitry;
   controller circuitry to control the controllable valve circuitry to deliver a flow rate of leaching fluid based on the flow rate signal and one or more flow rate thresholds; the controller circuitry also to determine, based on the flow rate signal, if the flow rate drops below a minimum flow rate threshold indicative of a clogged and/or kinked condition of the one or more leaching fluid lines; and to determine, based on the flow rate signal, if the fluid flow rate exceeds a maximum flow rate threshold indicative of a leak associated with one or more of the leaching fluid lines; and
   a flush manifold coupled to the leaching fluid lines and a controllable flush valve to flush the leaching lines; wherein the controller circuitry is configured to control the controllable flush valve to begin a flush operation if the flow rate drops below the minimum flow rate threshold; and wherein the controller circuitry further to trigger a status alert message to a remote monitoring interface if the fluid flow rate exceeds the maximum flow rate threshold.

7. The system of claim 6, further comprising power supply circuitry and a rechargeable battery system to provide power to at least the controller circuitry and the controllable valve circuitry.

8. The system of claim 7, further comprising a solar panel array to provide solar electricity to the power supply circuitry to recharge the rechargeable battery system.

9. The system of claim 6, further comprising heating circuitry to provide a heating source to at least the controllable valve circuitry.

10. The system of claim 6, further comprising communications circuitry to exchange commands and data with a remote interface.

11. The system of claim 6, wherein the leaching fluid lines are disposed vertically on a slope section of a leach pad.

12. The system of claim 6, wherein the leaching fluid lines are disposed horizontally on a horizontal section of a leach pad.

* * * * *